Figure 1:
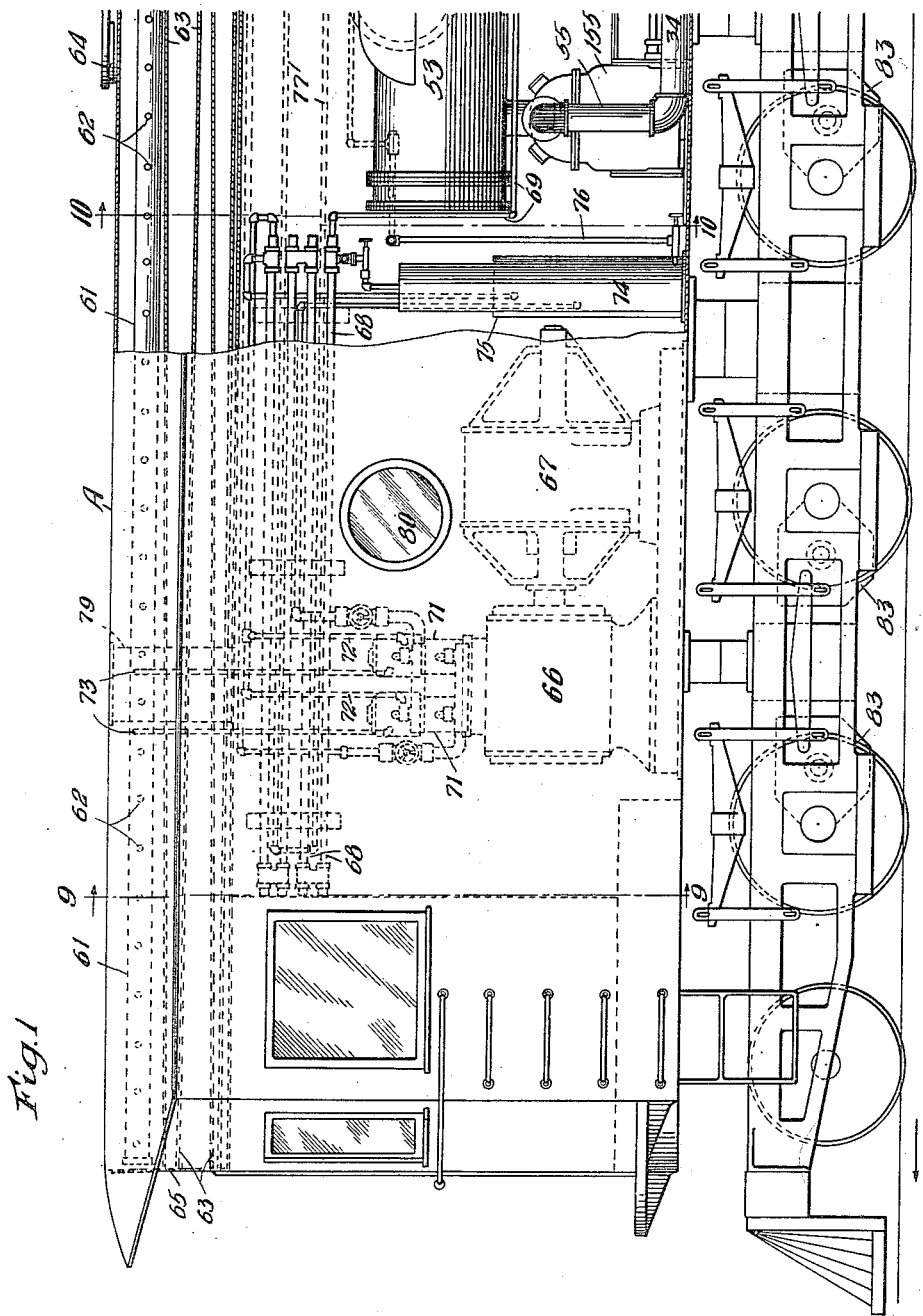

W. J. BOHAN.
COMBINED STEAM AND ELECTRIC LOCOMOTIVE.
APPLICATION FILED OCT. 29, 1917.

1,282,034.

Patented Oct. 22, 1918.
9 SHEETS—SHEET 1.

WITNESSES:
Wm. Geiger

INVENTOR.
William J. Bohan
BY Geo. I. Haight
ATTORNEY

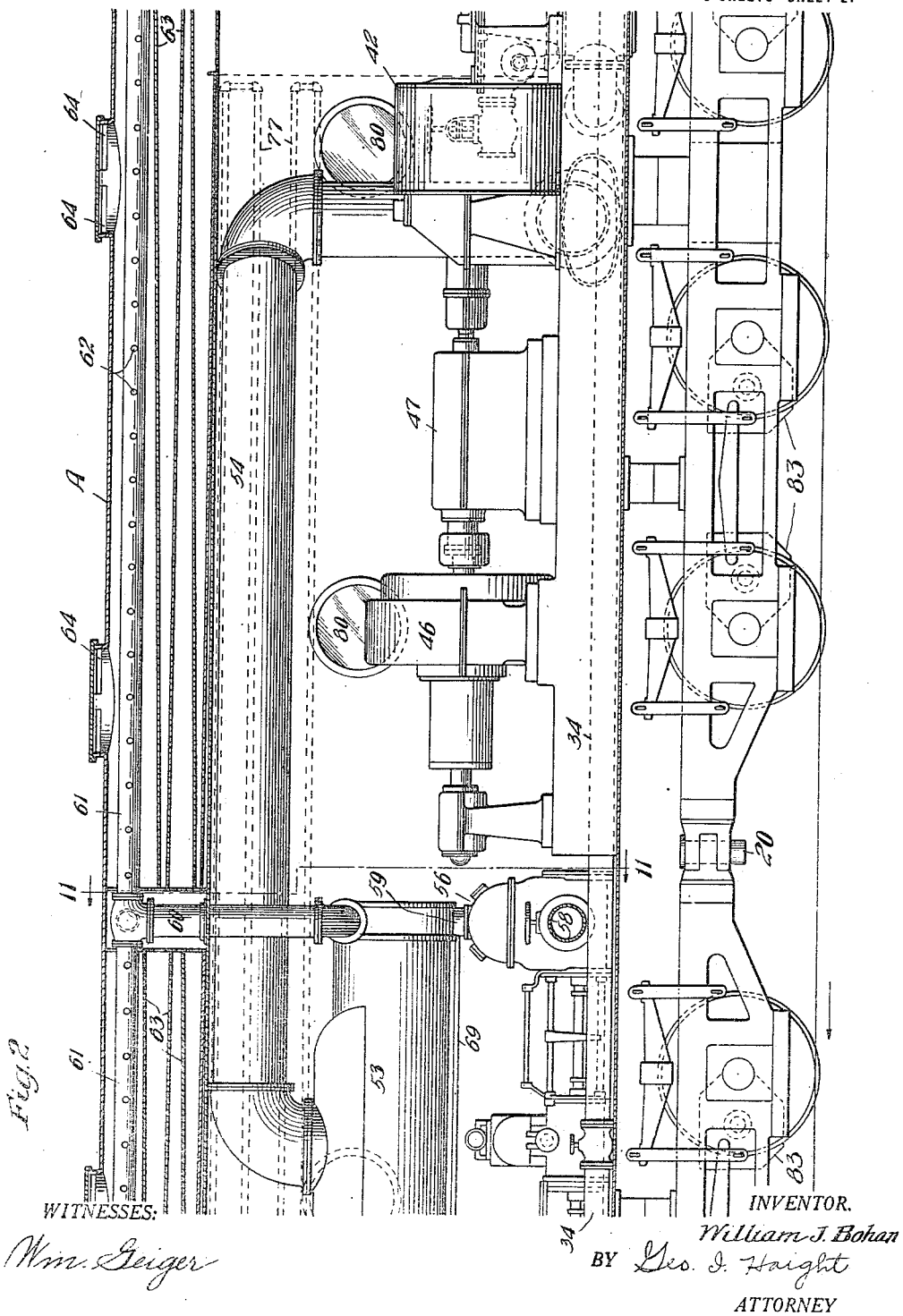

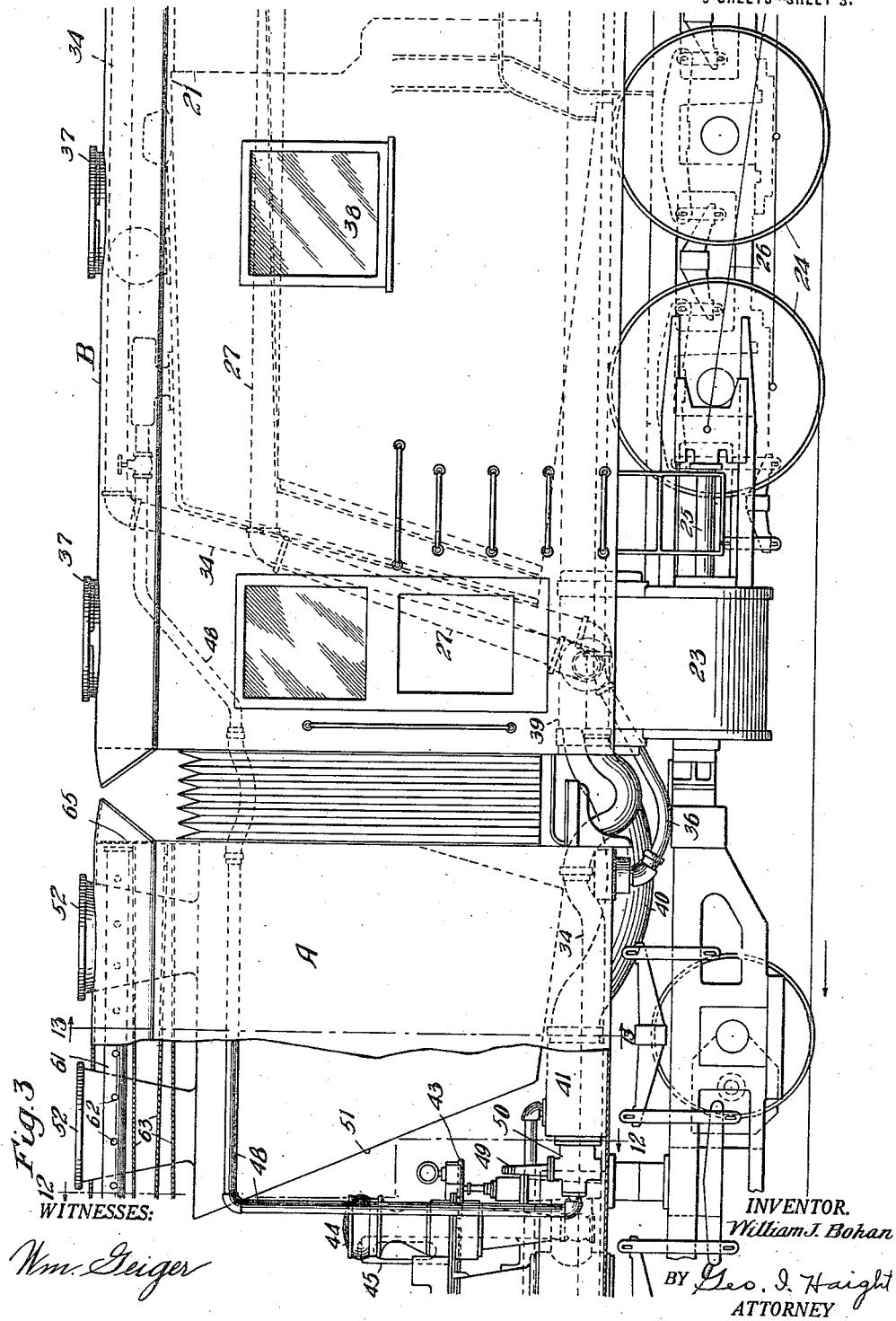

W. J. BOHAN.
COMBINED STEAM AND ELECTRIC LOCOMOTIVE.
APPLICATION FILED OCT. 29, 1917.
1,282,034.
Patented Oct. 22, 1918.
9 SHEETS—SHEET 4.
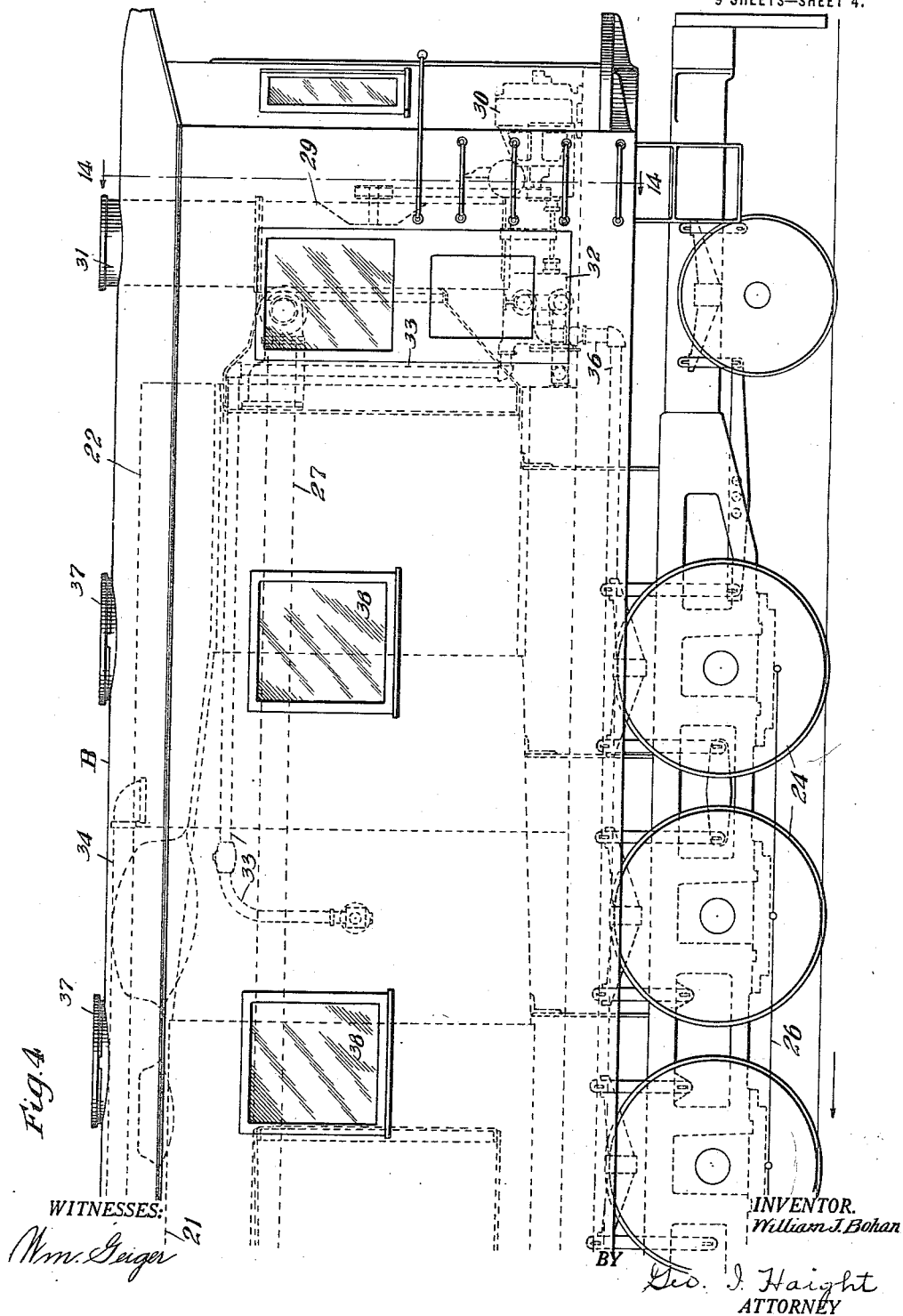

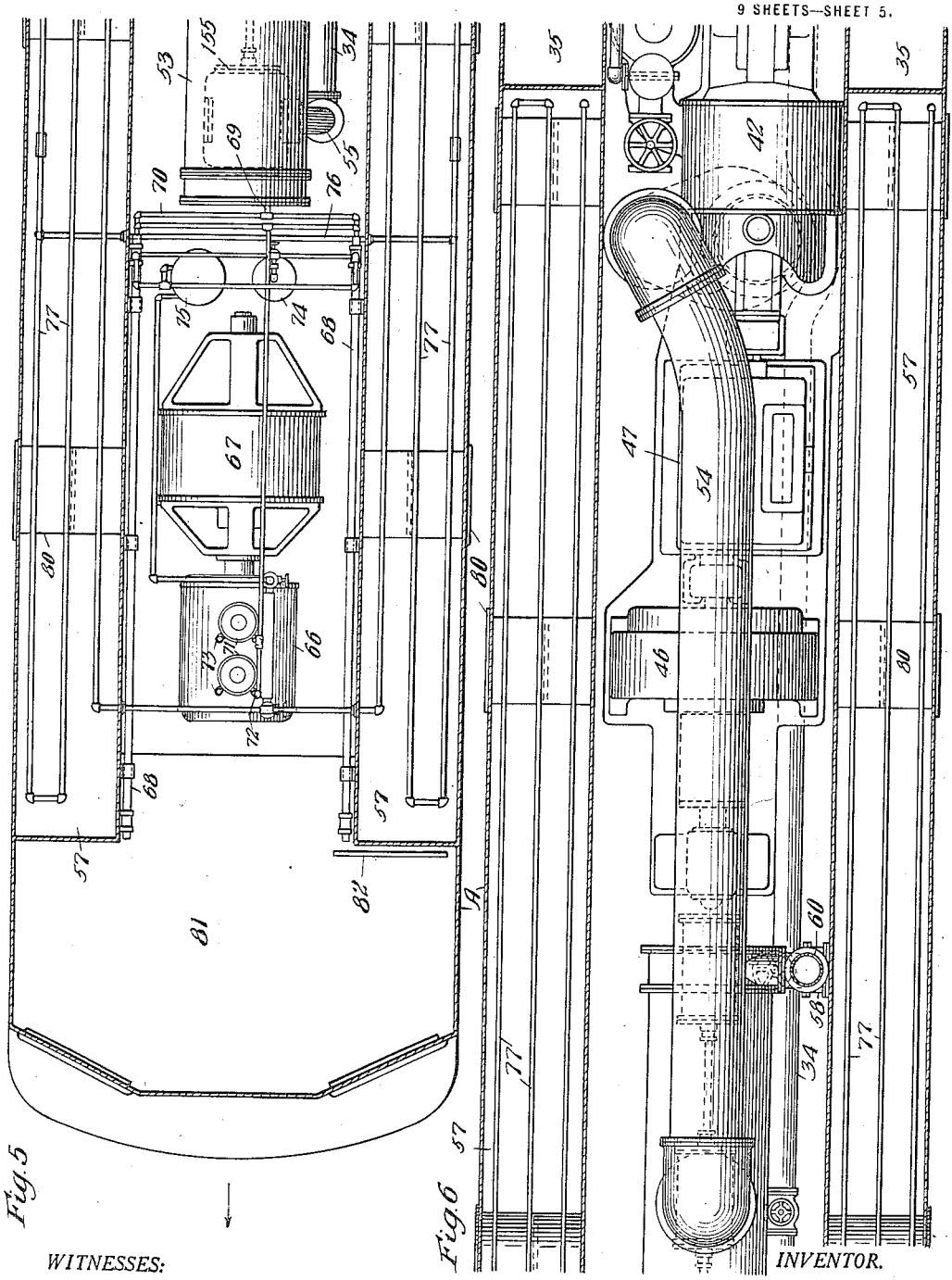

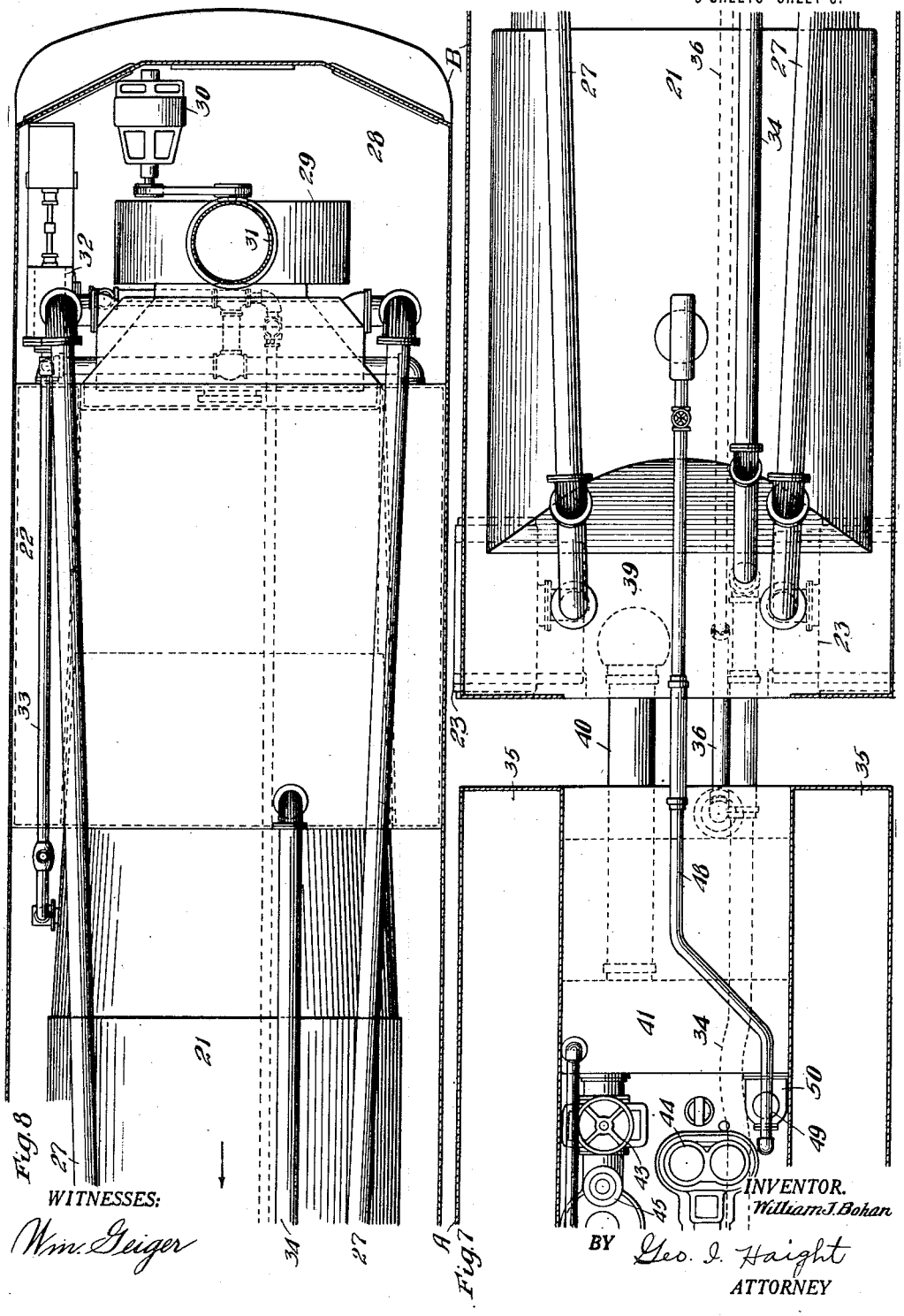

W. J. BOHAN.
COMBINED STEAM AND ELECTRIC LOCOMOTIVE.
APPLICATION FILED OCT. 29, 1917.
1,282,034.
Patented Oct. 22, 1918.
9 SHEETS—SHEET 7.
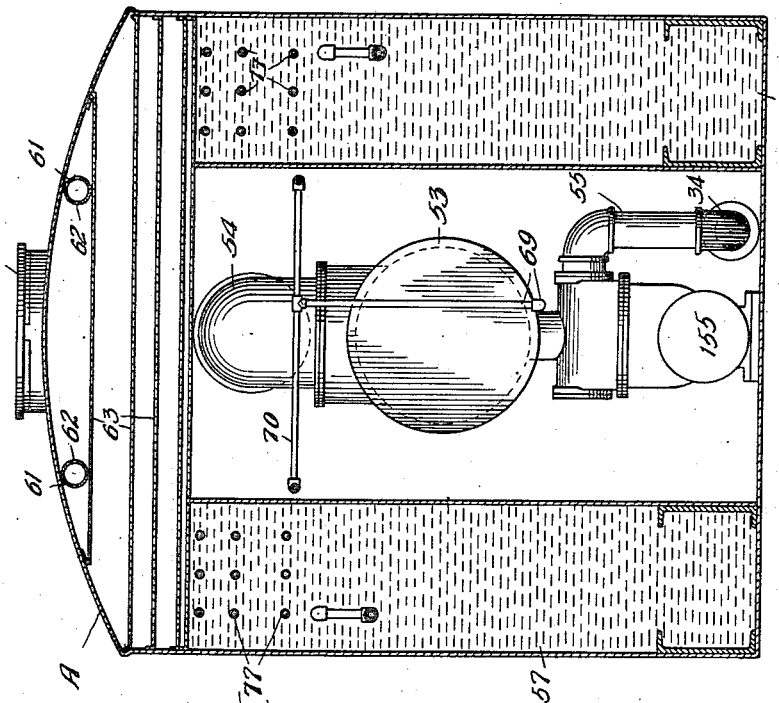
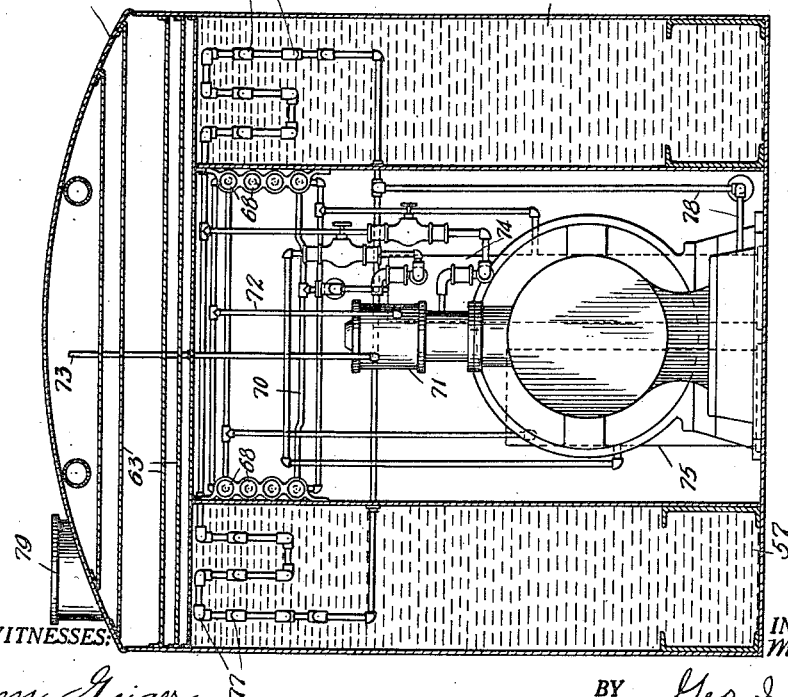

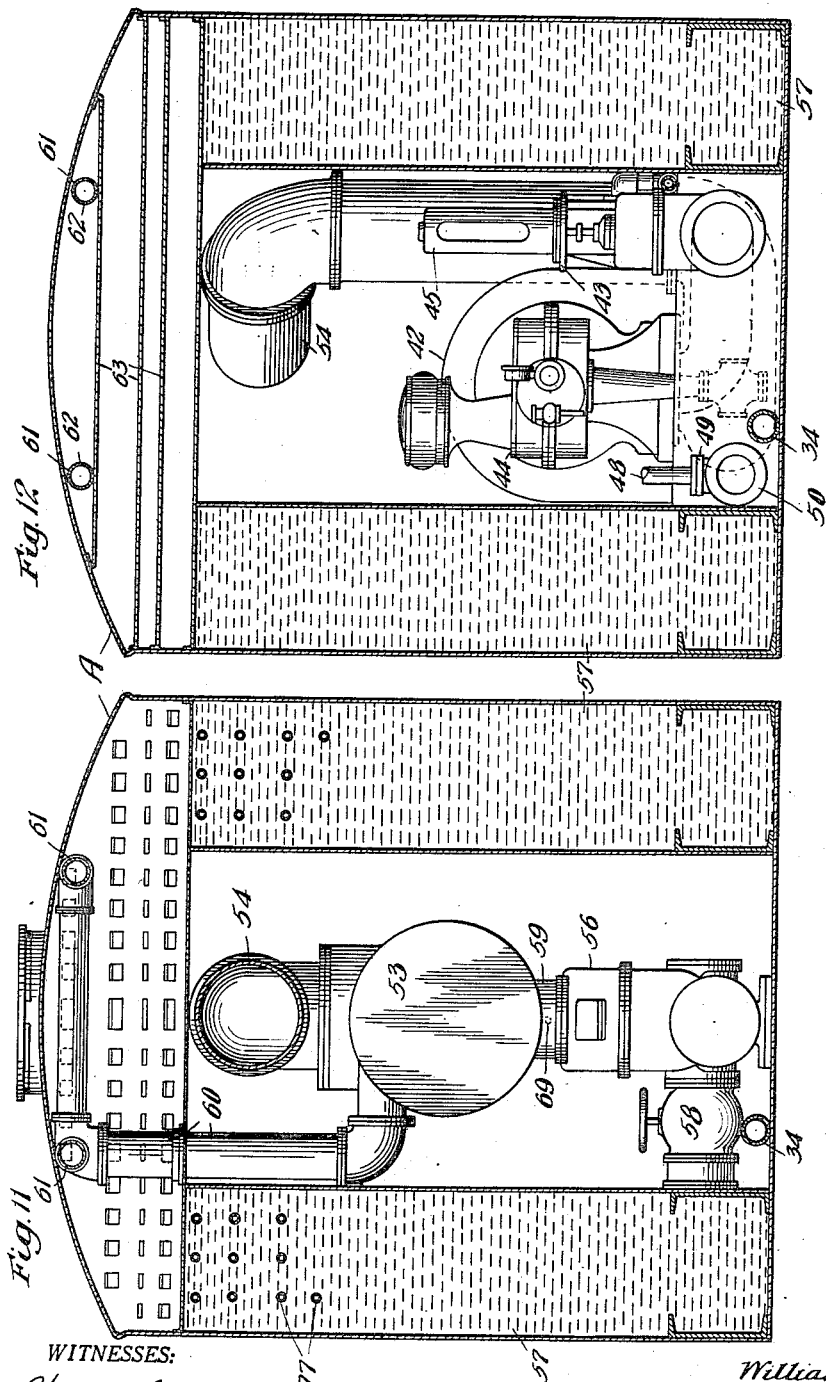

W. J. BOHAN.
COMBINED STEAM AND ELECTRIC LOCOMOTIVE.
APPLICATION FILED OCT. 29, 1917.
1,282,034.
Patented Oct. 22, 1918.
9 SHEETS—SHEET 9.
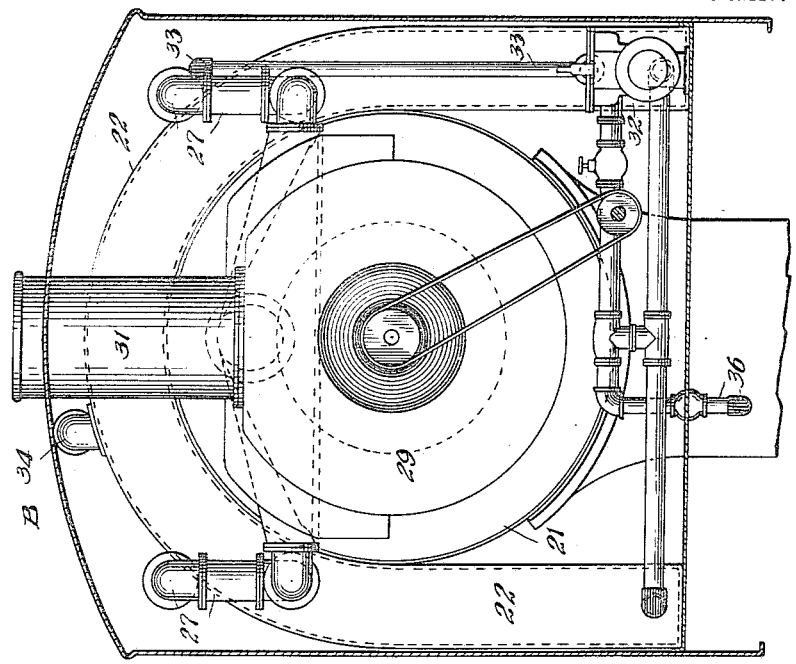
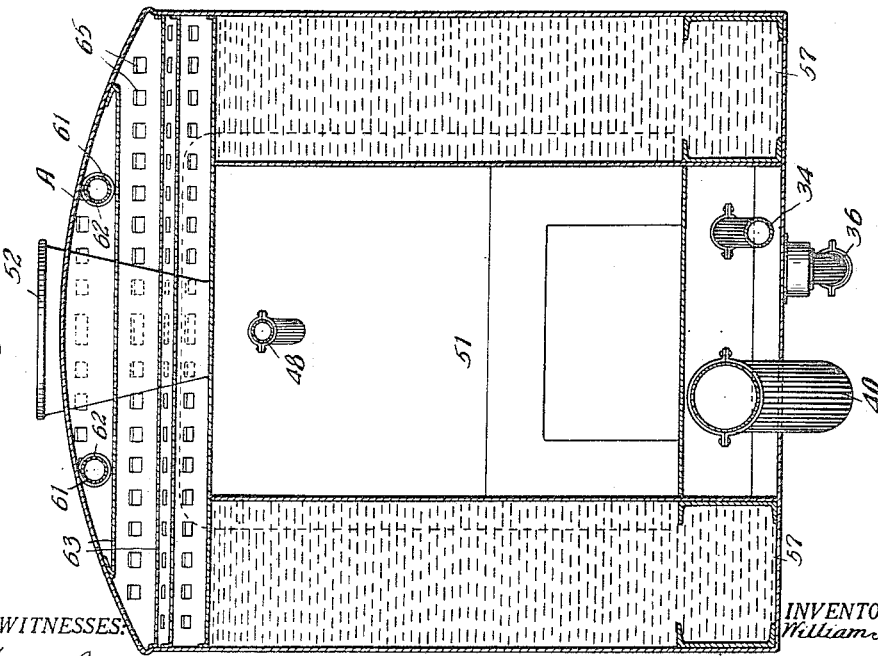
WITNESSES:
Wm. Geiger
INVENTOR.
William J. Bohan
BY Geo. I. Haight
ATTORNEY

UNITED STATES PATENT OFFICE.

WILLIAM J. BOHAN, OF ST. PAUL, MINNESOTA.

COMBINED STEAM AND ELECTRIC LOCOMOTIVE.

1,282,034.     Specification of Letters Patent.     Patented Oct. 22, 1918.

Application filed October 29, 1917. Serial No. 198,993.

*To all whom it may concern:*

Be it known that I, WILLIAM J. BOHAN, a citizen of the United States, residing at St. Paul, in the county of Ramsey and State of Minnesota, have invented a certain new and useful Improvement in Combined Steam and Electric Locomotives, of which the following is a full, clear, concise, and exact description, reference being had to the accompanying drawings, forming a part of this specification.

This invention relates to improvements in combined steam and electric locomotives.

One object of the invention is to provide a railway locomotive unit of high capacity in which are combined steam and electric sections operating with high efficiency and so designed as to require a minimum amount of water-carrying capacity consistent with the high power of the locomotive.

Another and more specific object of the invention is to provide a locomotive unit of the type above indicated wherein the electric power generated for locomotion is obtained by employing the exhaust steam from the steam locomotive unit proper through the intermediary of a turbo-generator set.

Another and specific object of the invention is to provide a locomotive unit of the type above indicated on which is employed a refrigerating unit to assist in condensing the steam after the power has been obtained therefrom both by the steam locomotive section and the turbo-generator set whereby the condensate may be returned to the boiler of the steam locomotive section with maximum efficiency.

The invention furthermore consists in the improvements in the parts and devices and various combinations of the parts and devices herein shown, described and forming the subject matter of the appended claims.

In the drawings forming a part of this specification, there is illustrated one embodiment of my invention and in said drawings, Figures 1, 2, 3 and 4, taken together, illustrate the entire locomotive unit comprised of two sections, part of said drawings being in side elevation and part in vertical section, the sectional portions being substantially at the center of the locomotive. In said drawings, the end of the locomotive illustrated in Fig. 1 is designed as the head end of the locomotive, the engineer's cab being disposed at this end, as will be hereinafter described. Figs. 5, 6, 7 and 8, together, constitute a longitudinal horizontal section of the locomotive, the horizontal section being taken for the greater part a short distance below the roof of the locomotive. Figs. 9, 10, 11, 12, 13 and 14 are vertical, transverse sectional views, taken respectively, on the section lines 9—9, 10—10, 11—11, 12—12, 13—13 and 14—14 of Figs. 1 to 4, inclusive, the sections looking in the direction of the respective arrows on said section lines.

As shown in said drawings, the combined steam and electric locomotive unit is formed in two sections, a section A, which for convenience, may be termed the electric section, and a section B, which for convenience of description, may be termed the steam section. The section B is provided with 10 traction wheels driven by steam mounted on suitable trucks, and the section A is provided with 16 traction wheels having direct electric drives, said traction wheels being mounted on two frames articulately connected, as indicated at 20 in Fig. 2. The back frame of the section, or electrical section, is articulately connected to the frame of the first or steam section.

Referring to the steam section B, the same is shown as having a boiler 21, hot well 22 and cylinders 23, from which the traction wheels 24 are driven by piston rods 25 and connecting links 26. The cylinders 23 are supplied with live steam by the pipes 27 in the usual or any desired manner. At the rear end of the section B, a compartment or cab 28 is provided in which is located a fan 29 electrically driven by a motor 30 for promoting the draft, the products of combustion being finally passed to the atmosphere through the smoke-stack 31. Also located in said compartment 28 is a boiler feed pump indicated conventionally at 32, the water being pumped thereby through the pipe 33 to the boiler. The main supply of water to the hot well of the steam section is in the form of a condensate, obtained in the manner hereinafter described, and supplied through the pipe 34. An auxiliary cold water supply is preferably obtained from the cold water well 35 carried by the section A through the pipe 36, it being understood that the latter is suitably connected with the feed pump 32. Auxiliary water supply may also be provided from the tank 57 through suitable connections to the feed pump 32. Ventilators 37—37 are provided in the top of the section B and side windows 38 are also provided. In the drawings, the fan unit, feed pump and cylinders are indicated conventionally inasmuch as the same may be of well known or desired construction and detailed description or illustration thereof is not deemed necessary for an understanding of the invention by those skilled in the art.

The electric section A carries the turbo-generator set, the refrigerating plant, both of which have been heretofore referred to, the coal pocket, the circulating water tanks and the cold water feed well. The turbo-generator set will first be described and the manner of operating the same by the exhaust steam obtained from the cylinders 23 of the steam section B.

As shown most clearly in Figs. 7 and 13, the section B is provided with a receiving chamber 39 between the cylinders 23 and into which the exhaust steam from the cylinders 23 is directed, there being preferably interposed a series of baffles between the cylinders and the chamber 39. From the chamber 39, the exhaust steam is conducted by flexible pipe 40 to a second receiving chamber 41 on the section A. The purpose of providing the two chambers 39 and 41 with the baffles interposed between the cylinders 23 and the chamber 39 is to overcome, so far as possible, the pulsating effect of the exhaust steam from the cylinders so as to maintain a more uniform pressure on the supply of exhaust steam to the turbo-generator set.

From the chamber 41, the exhaust steam is directed to the turbine proper 42 of the turbo-generator set, the control of the steam being obtained through a valve operated by a handle 43, shown most clearly in Fig. 7. The turbine is provided with the usual oil feed pump 44, oil separator 45, gages, etc., as shown most clearly in Figs. 2, 6, 7 and 12, said parts being indicated conventionally since the turbo-generator set is of the well known Parsons type. Interposed between the turbine 42 proper and the generator 46 is the usual gear casing 47, as clearly appears from Figs. 2 and 6.

In starting the locomotive or when the exhaust steam supply for the turbo-generator set is insufficient, live steam may be supplied thereto by a pipe 48 which is connected with the boiler of the steam section B and communicates with the receiving chamber 41, there being interposed in said lines a suitable pressure-reducing valve 49 and an over-pressure valve 50, as indicated in Fig. 3. The pressure-reducing valve will preferably be set to 8 lbs. and the over-pressure valve to 11 lbs., although either may be set at either pressure desired.

The coal chute, as heretofore indicated, is carried by the section A and is designated by the reference 51, the coal being supplied thereto through suitable hatches 52—52.

The exhaust steam from the turbine is conducted to a condenser, indicated generally by the reference 53, said exhaust steam being so conveyed by pipe 54. The steam in the condenser 53 is condensed in the manner hereinafter described and the condensate is taken off through pipe 55 which, through suitable connections, is in communication with said condensate supply pipe 34 hereinbefore described and by which the supply of water for the boiler is maintained. The condensate from the condenser 53 is drawn off by means of a condensate and vacuum pump, indicated at 155. As will be understood, the turbine is operated on the vacuum principle in a well known manner.

For condensing the exhaust steam in the condenser 53, a circulating pump 56 is provided, the water thereto being obtained from the circulating water tanks 57—57 which extend along both sides of the section A for the greater portion of the length thereof, the connection between the pump 56 and said tanks 57 being indicated at 58 in Figs. 2 and 11 with suitable valve control, as will be understood. From the pump 56, the cooling water is forced into the condenser 53 through pipe 59 and from the condenser 53, the cooling water is forced up to the roof of the section A through pipe 60. At its top, the pipe 60 is suitably connected with two longitudinally extending pipes 61—61 directly beneath the roof of the locomotive, which pipes 61 extend substantially the entire length of the section A and are perforated throughout their length, as indicated at 62—62. With this arrangement, the cooling water after it has passed through the condenser 53 and thereby heated is sprayed onto a series of cooling pans 63 located in the upper portion of the section A and suitably sloped so that the water runs from one pan onto the next lower pan and is finally drained into the circulating water wells 57—57. To assist in cooling the water while running over the cooling or drip pan 63, are ventilators 65 at the ends of the roof of second or electrical section, as shown in Figs. 1, 2 and 3. Ventilators 64 in the roof connect with the turbine room for ventilation.

To accelerate the condensing of the exhaust steam in the condenser 53 and to maintain the temperature of the circulating water in the tanks 57 at as low a temperature as practical to thereby increase the efficiency of the locomotive, I have provided a refrigerating set consisting broadly of an ammonia compressor 66 driven from a motor 67. The ammonia condenser is most clearly illustrated in Figs. 1, 5 and 9 and, as there shown, comprises a series of pipes 68 mounted in two sets of brackets on the inner sides of the water tanks 57. The cooling water for the ammonia condenser is supplied by the circulating pump 56 through a pipe 69 which is tapped into the pipe 59 between the pump 56 and the condenser proper 53. The cooling water thus supplied through the pipe 69 is conducted to the ammonia condenser sections on each side of the car through a suitable cross pipe 70 and this cooling water is next conducted to the water jackets of the ammonia compressor cylinders 71—71 through pipes 72—72. After passing through the water jackets of the cylinders 71, said cooling water is then forced upwardly through pipes 73—73 to the roof of the locomotive where it finally flows over into the adjacent cooling pans and ultimately flows back into the circulating water tanks 57. The ammonia after being compressed by the compressor 66 is conducted to the ammonia receiver 74 and after passing through a suitable oil separator 75 is conducted by piping 76 to a series of coils 77 preferably located in the circulating water tanks 57—57 near the top thereof, as most clearly shown in Figs. 1, 6, 9, 10 and 11, the return from said coils to the compressor being through the pipes 78. If desired, the ammonia coils may be located on cooling pans and cooling water allowed to flow over them.

Water for the tanks 57 may be supplied through a suitable opening 79 on one side of the locomotive, as indicated in Fig. 9, it being understood that the tanks 57—57 are in communication with each other. Suitable windows 80—80 are provided in the sides of the section A, the same being extended through the tanks 57, as clearly shown in the drawing. Also, the section A is provided at its forward end, that is, the left hand end as shown in Figs. 1 and 5, with the engineer's cab designated generally by the reference 81 and in this cab will be located a suitable panel board 82 conveniently located by which the engineer can effect the necessary electrical controls. In this connection, it will be understood that the engineer, being located a considerable distance from the throttle and reverse lever of the steam locomotive, must be able to control the throttle and reverse lever from a distance, and for this purpose I have designed an electrically operated remote control for the reverse lever and throttle which forms the subject matter of another application Serial No. 201,720, filed Nov. 12, 1917. I do not deem it necessary to describe said remote control in this application since it will be understood that any suitable form of remote control may be employed without departing from the invention disclosed in this application.

Each set of traction wheels of the section A is directly driven by a suitable electric motor 83 connected to the axle thereof, the details of which it is not necessary to herein describe.

With the arrangements hereinbefore described, it will be seen that I obtain a maximum amount of energy from the steam generated by the steam locomotive section and that by employing a refrigerating unit in conjunction with the condenser, I am enabled to obtain maximum efficiency in the operation of the turbine while at the same time the minimum amount of circulating water is required to be carried by the locomotive. In connection with the locomotive boiler, the water is used over and over and only a comparatively small amount of cold water will be required from the cold water well or tank 57 to take the place of that water which is lost by evaporation, leakage, etc.

The arrangement which I have herein shown and described is merely illustrative of one embodiment of the invention, it being understood that the various parts thereof, such as the turbo-generator set, the condenser, the refrigerating plant, the pumps, etc., may be of any well known or desired form, the invention in its broader aspects contemplating the combination of the various units or elements herein described and not necessarily the details of construction thereof except as specified in certain of the claims. All changes and modifications are contemplated as come within the scope of the claims appended hereto.

I claim:

1. In a locomotive unit of the character described, having a plurality of traction wheels, the combination with a boiler, cylinders, and connections from said cylinders to certain of said traction wheels, of a turbo-generator, electric motor drives for others of said traction wheels, a condenser for exhaust steam from the turbo-generator, and means for refrigerating the cooling solution of the condenser.

2. In a locomotive unit of the character described, having a plurality of traction wheels, the combination with a steam driven section, of a second section associated with the first named section and having electrically driven traction wheels, means for generating the electricity on said second section including a steam motor device, means for condensing the exhaust steam, and a refrigerating device coöperable with said condensing means.

3. In a locomotive unit of the character described, the combination with a steam boiler, a turbo-generator set, direct steam driving means for some of the traction wheels of the locomotive and electric driving means for others of the traction wheels, of means for condensing the exhaust steam from the turbo-generator including a condenser and a refrigerating system for the cooling solution of the condenser.

4. In a locomotive unit of the character described, the combination with a steam driven section, of an electrically driven section, the last named section being provided with a turbo-generator set, a condenser and a refrigerating system for the cooling water of the condenser.

5. In a locomotive unit of the character described, the combination with a steam driven section including cylinders and connections from the cylinders to the traction wheels thereof, of a second section associated with the first section, said second section having a turbo-generator set operated by the exhaust steam from said cylinders, a condenser for the exhaust steam from the turbo-generator set, means for returning the condensate to the boiler of the first named section, and means for artificially cooling the cooling solution of said condensate.

6. In a locomotive unit of the character described, the combination with a steam section, of a second section having a turbo-generator set thereon, said turbo-generator set being operated by the exhaust steam from the steam section, and means interposed between the turbo-generator set and the steam section for insuring uniform pressure of the exhaust steam supplied to the turbo-generator set.

7. In a locomotive unit of the character described, the combination with a steam section having a boiler, cylinders and traction wheels directly driven from said cylinders, of a second section having motor driven traction wheels, a turbo-generator set carried by said second section, steam connections for conducting the exhaust steam from said cylinders to the turbo-generator set for operating the latter, and means interposed between said cylinders and the turbine to minimize the pulsating effect of the exhaust steam from said cylinders.

8. In a locomotive unit of the character described, the combination with a steam section and a second section, said second section having a steam condenser thereon, means for providing circulating cooling water for said condenser, said means including water tanks extending lengthwise of the unit on the sides thereof, and cooling pans to which the water after passing through the condenser is transferred, the cooling pans being located above the water tanks.

9. In a locomotive unit of the character described, the combination with a steam operated section, of an electrically operated section, the latter having mounted thereon a turbo-generator set, a condensing system, and a refrigerating system, the condensate in said condenser being transferred to the boiler of the steam operated section, and a cold water well carried by the electrically driven section and in communication with said boiler for replenishing water losses thereto.

10. In a locomotive unit of the character described, the combination with a steam operated section including a boiler, cylinders, and connections from the cylinders to the traction wheels, of a second section having a turbo-generator set operated by the exhaust steam from said cylinders, a condensing system from the turbo-generator set, and a refrigerating system, said condensing system including tanks for the circulating water located along the sides of the section and said refrigerating system having the refrigerating coils thereof disposed within parts of said condensing system.

11. In a locomotive unit, the combination with a steam boiler, cylinders, connections from said cylinders to some of the traction wheels of the locomotive, a turbo-generator set operated by the exhaust steam from said cylinders, a condensing system for condensing the exhaust steam from the turbo-generator set, means for transferring the condensate to said boiler, and a refrigerating system, said condensing system including circulating water tanks and cooling pans and said refrigerating system having the refrigerating coils thereof disposed within parts of said condensing system.

12. In a locomotive unit of the character described, the combination with a steam operated section, of a second section associated therewith and forming the complete unit, the second section being formed with circulating water tanks along the sides thereof and cold water wells with a passage extending centrally longitudinally of the section, and a turbo-generator set, a condenser, and an ammonia compressor disposed within said passageway.

13. In a locomotive unit of the character described, the combination with two sections, each having traction wheels, one of said sections being provided with a boiler for supplying steam, cylinders and connections therefrom for driving some of said traction wheels, a turbo-generator set operated by the exhaust steam from said cylinders, means interposed between said cylinders and the turbo-generator set for minimizing the pulsating effect of the exhaust steam from said cylinders, a condensing system including a condenser proper and circulating water tanks therefor, and an ammonia refrigerating system for refrigerating the cooling solution of said condenser.

In witness that I claim the foregoing I have hereunto subscribed my name this 19th day of Oct., 1917.

WILLIAM J. BOHAN.

Witness:
JOSEPH HARRIS.